(12) United States Patent
Lutz et al.

(10) Patent No.: US 6,749,270 B1
(45) Date of Patent: *Jun. 15, 2004

(54) DEVICE AND METHOD FOR CONTROLLING AT LEAST ONE OPERATING-DYNAMICS VARIABLE OF A VEHICLE IN A CLOSED LOOP

(75) Inventors: Albert Lutz, Marbach (DE); Manfred Gerdes, Korntal-Muenchingen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 375 days.

(21) Appl. No.: 09/280,921

(22) Filed: Mar. 29, 1999

(30) Foreign Application Priority Data

Mar. 31, 1998 (DE) ........................................ 198 14 216

(51) Int. Cl.[7] .............................................. B60T 8/34
(52) U.S. Cl. .................................................. 303/113.2
(58) Field of Search ........................ 303/116.1, 113.2, 303/139, 166, DIG. 3, DIG. 4

(56) References Cited

U.S. PATENT DOCUMENTS

| | | | |
|---|---|---|---|
| 5,205,623 A | | 4/1993 | Holzmann et al. |
| 5,348,380 A | * | 9/1994 | Korasiak et al. ...... 303/115.4 X |
| 5,727,854 A | * | 3/1998 | Pueschel et al. ............ 303/155 |
| 5,826,950 A | * | 10/1998 | Jonner et al. ............ 303/113.2 |

FOREIGN PATENT DOCUMENTS

| | | | |
|---|---|---|---|
| DE | 40 35 527 | 5/1992 | |
| DE | 43 40 921 A1 | 12/1993 | |
| DE | 195 37 439 A1 | 10/1995 | |
| DE | 196 19 985 A1 | 5/1996 | |
| DE | 197 12 889 | 10/1998 | |
| GB | 2297134 | * 1/1995 | .............. 303/113.2 |

OTHER PUBLICATIONS

"FDR—Die Fahrdynamikregelung von Bosch", ATZ 96, issue 11, 1994, pp. 674–689.**

* cited by examiner

Primary Examiner—Pam Rodriguez
(74) Attorney, Agent, or Firm—Kenyon & Kenyon

(57) ABSTRACT

Device and method for controlling at least one operating-dynamics variable of a vehicle in closed loop. The device includes a braking system which contains a reservoir for accommodating a braking medium, and at least one brake circuit. The brake circuit includes first valve arrangements on the output side and a second valve arrangement on the incoming side. Wheel brake cylinders allocated to the brake circuit are connected to the first valve arrangements. The reservoir is connected to the second valve arrangement. The device includes a system with which the wheel brake cylinder exhibiting the greatest brake pressure is ascertained for the at least one brake circuit. If a driver-independent brake actuation exists, then the brake pressure of the wheel brake cylinder exhibiting the greatest brake pressure is adjusted by appropriate driving of the second valve arrangement. To adjust, in each case, the brake pressure of the remaining wheel brake cylinders of the brake circuit, the first valve arrangement allocated to the respective wheel brake cylinder is appropriately driven, in addition to the second valve arrangement.

15 Claims, 3 Drawing Sheets

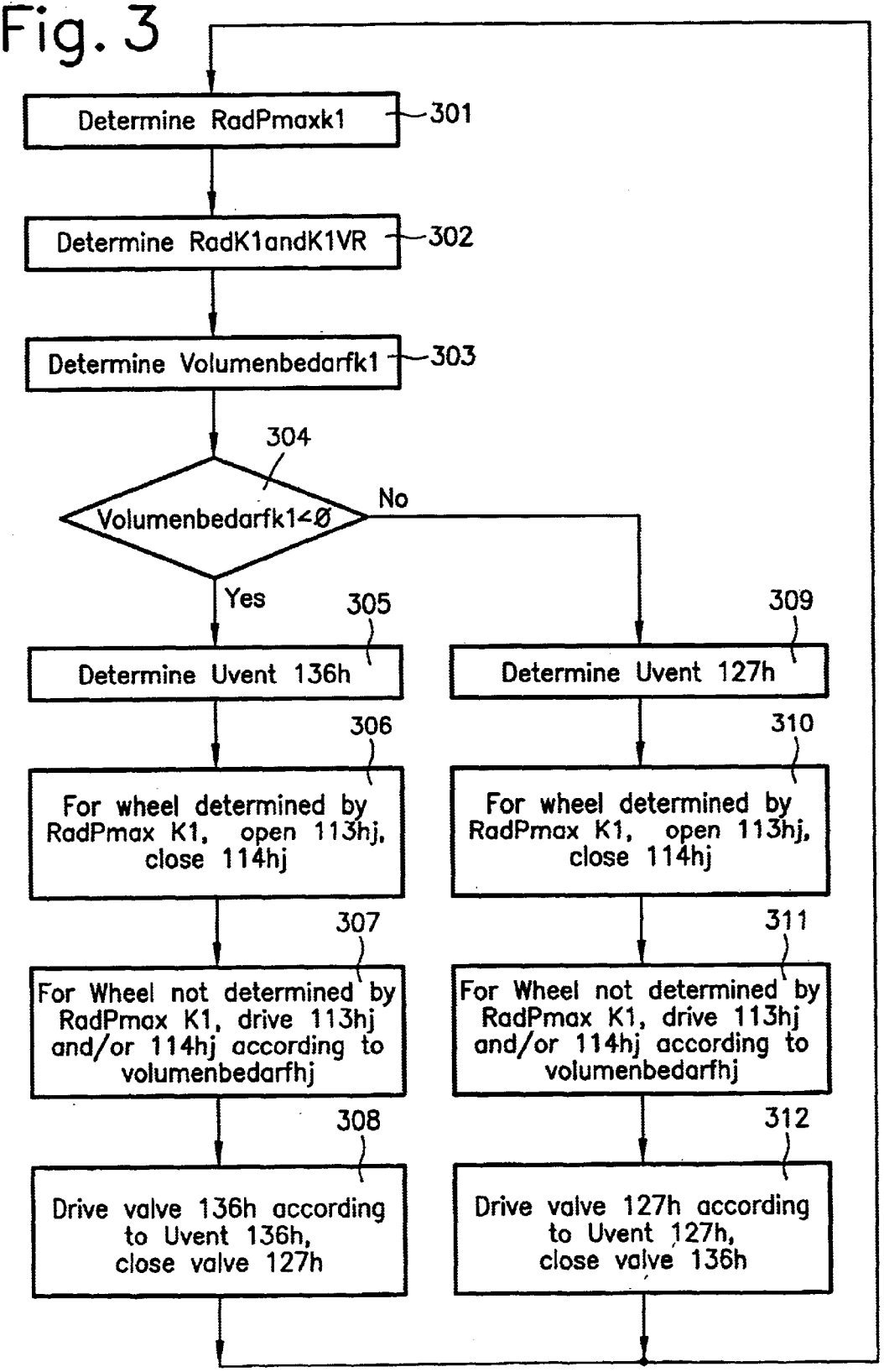

DEVICE AND METHOD FOR CONTROLLING AT LEAST ONE OPERATING-DYNAMICS VARIABLE OF A VEHICLE IN A CLOSED LOOP

FIELD OF THE INVENTION

The present invention relates to a device and a method for controlling at least one operating-dynamics variable of a vehicle in closed loop. In particular, the present invention relates to a driving control of a braking system of the vehicle, and to the device utilized for this purpose.

BACKGROUND INFORMATION

Conventional devices and methods for controlling at least one operating-dynamics variable of a vehicle are known in numerous variations. For example, the publication "FDR—Die Fahrdynamikregelung von Bosch" (FDR—Operating-Dynamics Control of Bosch), on pages 674–689 of the automobile technology periodical (ATZ) 96, 1994, issue 11, describes an exemplary conventional device and method. In this operating-dynamics control, a setpoint value is determined for the vehicle float angle and yaw rate, respectively, on the basis of at least the steering-wheel angle and the vehicular velocity. The setpoint values for the float angle and the yaw rate are supplied, together with the corresponding actual values, to a state controller which determines vehicle setpoint yawing moments from the corresponding system deviations. These vehicle setpoint yawing moments are converted, in view of the prevailing slip values, into setpoint slip changes at the suitable wheels. The setpoint slip changes are implemented by the subordinate ABS (antilock braking system) and ASR (traction control system) wheel-controller units. For example, when, during free rolling, the vehicle is oversteered in a right curve, and the setpoint yaw rate is exceeded, among other things, a setpoint brake slip is preset at the left front wheel, through which a yawing-moment change turning to the left acts on the vehicle, thereby reducing the overly great yaw rate. In the unbraked case, or when the driver initial pressure is not sufficient to adjust the desired setpoint slip, the pressure in the brake circuits is actively increased.

German Patent Application No. 40 35 527 (corresponding to U.S. Pat. No. 5,205,623) describes a hydraulic braking system having antilock braking system (ABS) and traction control system (ASR) for motor vehicles. This hydraulic conventional braking system features a hydraulic aggregate having at least one control valve and a return pump with at least one self-priming pump element which is operative in the brake circuit containing the at least one drive wheel. A valve arrangement, composed in each case of a charging valve and a selector valve, is used to make brake pressure available in ASR. The selector valve is arranged in the connection running from the master brake cylinder to the wheel brake cylinder of the drive wheel, and the charging valve is disposed in a suction line between the pump element and the brake-fluid reservoir. To achieve a hydraulic power requirement in ASR, the valve arrangement is driven in such a way that the selector valve blocks and the charging valve is opened for building up pressure, both valves block for holding pressure, and for reducing pressure, the charging valve blocks and the selector valve is opened.

With the above-described conventional devices and methods for controlling at least one operating-dynamics variable in closed loop (and the braking systems used in this context), in the event of a driver-independent brake-actuation as exists (e.g., during an ASR intervention), because of the driving of the circuit valves (i.e., the selector valve and the charging valve), pressure peaks can occur in a brake circuit while driving these valves due to the braking medium flowing into the brake circuit. These pressure peaks are not problematical in a large-volume design of the hydraulic aggregate. However, should a small-volume hydraulic aggregate be used, then greater pressure peaks can result due to the inflowing braking medium. These pressure peaks are disadvantageous for this hydraulic aggregate because of the great loading resulting from them.

One of the objects of the present invention is to provide a device and a method which make it possible to avoid high pressure peaks in the hydraulic aggregate in response to driver-independent braking interventions, thus reducing the loading of the hydraulic aggregate. Therefore, even small-volume hydraulic aggregates can be used.

SUMMARY OF THE INVENTION

The above-described pressure peaks, developing when carrying out a driver-independent braking intervention, are not problematical in large-volume hydraulic aggregates. However, should small-volume hydraulic aggregates be operated correspondingly, then the hydraulic aggregate must be driven by the appropriate controlling unit so that these pressure peaks do not occur, or occur only in reduced level. However, the full efficiency of the control is retained.

A braking system according to the present invention includes a reservoir for accommodating braking medium, and at least one brake circuit. The brake circuit contains first valve arrangements on the output side, and a second valve arrangement on the incoming side. Wheel brake cylinders allocated to the brake circuit are connected to the first valve arrangements. The reservoir is connected to the second valve arrangement. The first valve arrangement is composed in each case of a first and a second valve. The brake circuit further includes one pump. The second valve arrangement is composed in each case of a first valve, through which, in the flow-through (e.g., open) position, braking medium flows into the brake circuit in response to actuation of the pump, and of a second valve, through which, in the flow-through position, braking medium flows out of the brake circuit in response to actuation of the pump.

The device of the present invention includes means (e.g., an arrangement), with which the wheel brake cylinder exhibiting the greatest brake pressure is determined for the at least one brake circuit. During the time in which a driver-independent brake actuation exists, the first valve of the first valve arrangement is advantageously switched into the flow-through position, and the second valve of the first valve arrangement is switched into the blocking position for the wheel brake cylinder exhibiting the greatest brake pressure. Due to such driving control of the first valve arrangement, the pressure in the brake circuit corresponds to the pressure of the wheel brake cylinder exhibiting the greatest brake pressure. At the same time, the volume of the brake circuit is increased; thus possibly occurring pressure peaks cannot become all too large.

In response to a driver-independent brake actuation, in particular in response to a driver-independent build-up in brake pressure, the brake pressure of the wheel brake cylinder exhibiting the greatest brake pressure is advantageously adjusted by appropriate driving of the second valve arrangement. Due to this procedure, the first valve arrangement allocated to this wheel brake cylinder can remain in the above-described position. To adjust (in each case) the brake pressure of the remaining wheel brake cylinders of the brake circuit, the first valve arrangement allocated to the respective wheel brake cylinder is appropriately driven, in addition to the driving control of the second valve arrangement.

The first and second valve arrangements for the brake circuit are advantageously driven as follows. The respective volumetric requirement for the wheel brake cylinders allocated to the brake circuit is ascertained using appropriate means. In so doing, the respective volumetric requirement is advantageously ascertained at least as a function of the brake pressure which is adjusted in the respective wheel brake cylinder by the controlling unit on the basis of the setpoint selections. The sum of these volumetric requirements is ascertained on the basis of the individual volumetric requirements. By forming this sum, a measure is determined for ascertaining whether braking medium must be supplied to the brake circuit, or whether the braking medium must be removed from the brake circuit because of the driver-independent brake actuation. Since the second valve arrangement is composed of the "circuit valves" of the brake circuit which connect the brake circuit on the incoming side to the reservoir, and via which the braking medium can be carried into or out of the brake circuit, the second valve arrangement is advantageously driven as a function of the aforesaid sum. The first valve arrangements of the remaining wheel brake cylinders are driven in each case at least as a function of the volumetric requirement of the corresponding wheel brake cylinder.

The following is achieved for the brake circuit due to the above-described driving control of the first valve arrangements and of the second valve arrangement. Since the second valve arrangement is driven as a function of the sum of the individual volumetric requirements, only as much braking medium is fed to the brake circuit as is also necessary based on the requirement. Thus, no pressure peaks can develop. The same holds true for the removal of braking medium. The braking medium supplied via the second valve arrangement to the brake circuit is distributed to the remaining wheel brake cylinders according to their volumetric requirements by driving the first valve arrangements of the remaining wheel brake cylinders. Because the wheel brake cylinder exhibiting the greatest brake pressure is connected, by an appropriate interconnection (e.g., a switching arrangement) of the first valve arrangement allocated to it, to the brake circuit, the remaining wheel brake cylinders are also supplied by it (given appropriate pressure ratios). The resultant pressure losses in the wheel brake cylinder exhibiting the greatest brake pressure are compensated for by driving the second valve arrangement, into which the sum of the volumetric requirements enters.

The respective volumetric requirement of a wheel brake cylinder can be ascertained as a function of driving (trigger) times that are determined for actuating the first valve arrangement allocated to the respective wheel brake cylinder and/or as a function of the brake pressure prevailing in it at any one time, and/or as a function of a brake-pressure reference variable. In particular, the volumetric requirement is ascertained as a function of a difference determined between the brake pressure prevailing in the wheel brake cylinder and the brake-pressure reference variable.

As a function of the driving times, it is determined whether a brake-pressure build-up or a brake-pressure reduction exists for the wheel brake cylinder. For the brake-pressure reduction, a small predetermined value which can lie in the order of magnitude of, e.g., 0.4 bar is advantageously used as the brake-pressure reference variable. In the exemplary embodiment according to the present invention, this small value is definitively preset, however, it can also be adaptively determined. By using this small value, the respective volumetric requirement is first ascertained above this pressure value, resulting in an increase in the control precision, since, e.g., small fluctuations (particularly, sensor-contingent fluctuations) in an initial-pressure variable, which describes the initial pressure adjusted by the driver and which goes into the determination of the wheel brake cylinder pressures, are suppressed by this brake-pressure reference variable. The brake-pressure reference variable has the function of a threshold value. Consequently, a filtering is implemented by this procedure. If a brake-pressure buildup exists, a setpoint brake-pressure variable which describes the brake pressure to be adjusted in the appertaining wheel brake cylinder on the basis of the closed-loop control is selected as the brake-pressure reference variable. Therefore, for the brake-pressure buildup, the setpoint brake-pressure variable is selected as the brake-pressure reference variable, since the setpoint brake-pressure variable describes the brake pressure which is to be adjusted in the wheel brake cylinder on the basis of the actuation of the hydraulic aggregate.

With the determination of the difference determined between the brake pressure and the brake-pressure reference variable, and with the determination of the suitable driving times ascertained for actuating the respective first valve arrangements, it is possible to ascertain the respective volumetric requirement of the wheel brake cylinder. For the brake-pressure reduction, the volumetric requirement is advantageously ascertained using a first mathematical model, in particular, using physical relationships. For the brake-pressure build-up, the volumetric requirement is advantageously ascertained using a second mathematical model, in particular, evaluating a characteristics field as a function of the brake pressure.

The sum of the individual volumetric requirements is compared to a comparison value, in particular to a zero value. This comparison determines whether the braking medium must be supplied to the brake circuit, or whether the braking medium must be removed from the brake circuit. If this sum is greater than or equal to the comparison value, the first value of the second valve arrangement is driven as a function of this sum, and the second valve of the second valve arrangement is closed. If this sum is smaller than the comparison value, the first valve of the second valve arrangement is closed, and the second valve of the second valve arrangement is driven as a function of this sum.

It should be noted how the term volumetric requirement is to be understood in connection with the device and method according to the present invention. For the brake-pressure build-up, a positive volumetric requirement exists which indicates how much braking medium is to be supplied to the brake circuit. For the brake-pressure reduction, a negative volumetric requirement exists which indicates how much braking medium must be taken out or removed from the brake circuit.

The times for driving the first and the second valve of the second valve arrangement are advantageously ascertained as a function of a brake-circuit pressure variable which describes the brake pressure prevailing in the brake circuit, and as a function of the sum of the volumetric requirements. The driving time for the first valve is ascertained using a third mathematical model, preferably evaluating a characteristics field as a function of the brake-circuit pressure variable. The driving time for the second valve is ascertained using a fourth mathematical model, in particular using physical relationships.

The device according to the present invention further includes means (e.g., another arrangement) with which the number and/or the type of the brake-circuit wheel brake cylinders at which the brake pressure is increased is ascertained as a function of the driving times for the first valve arrangements. The number and/or the type of these wheel brake cylinders is taken into account in the driving of the first valve of the second valve arrangement. The type of the wheel brake cylinders is taken into account, since, for example, the wheel brake cylinders of the front axle have a larger volume than the wheel brake cylinders of the rear axle, and therefore exhibit different behavior in response to a brake-pressure build-up. The number of wheel brake cylinders is taken into account, since the brake circuit behaves differently in response to the brake-pressure build-up, depending upon the number of wheel brake cylinders at which the brake pressure is increased.

BRIEF DESCRIPTION OF THE DRAWINGS

FIG. 3 shows a flow chart of an exemplary embodiment of the method according to the present invention.

DETAILED DESCRIPTION

Figure 1:
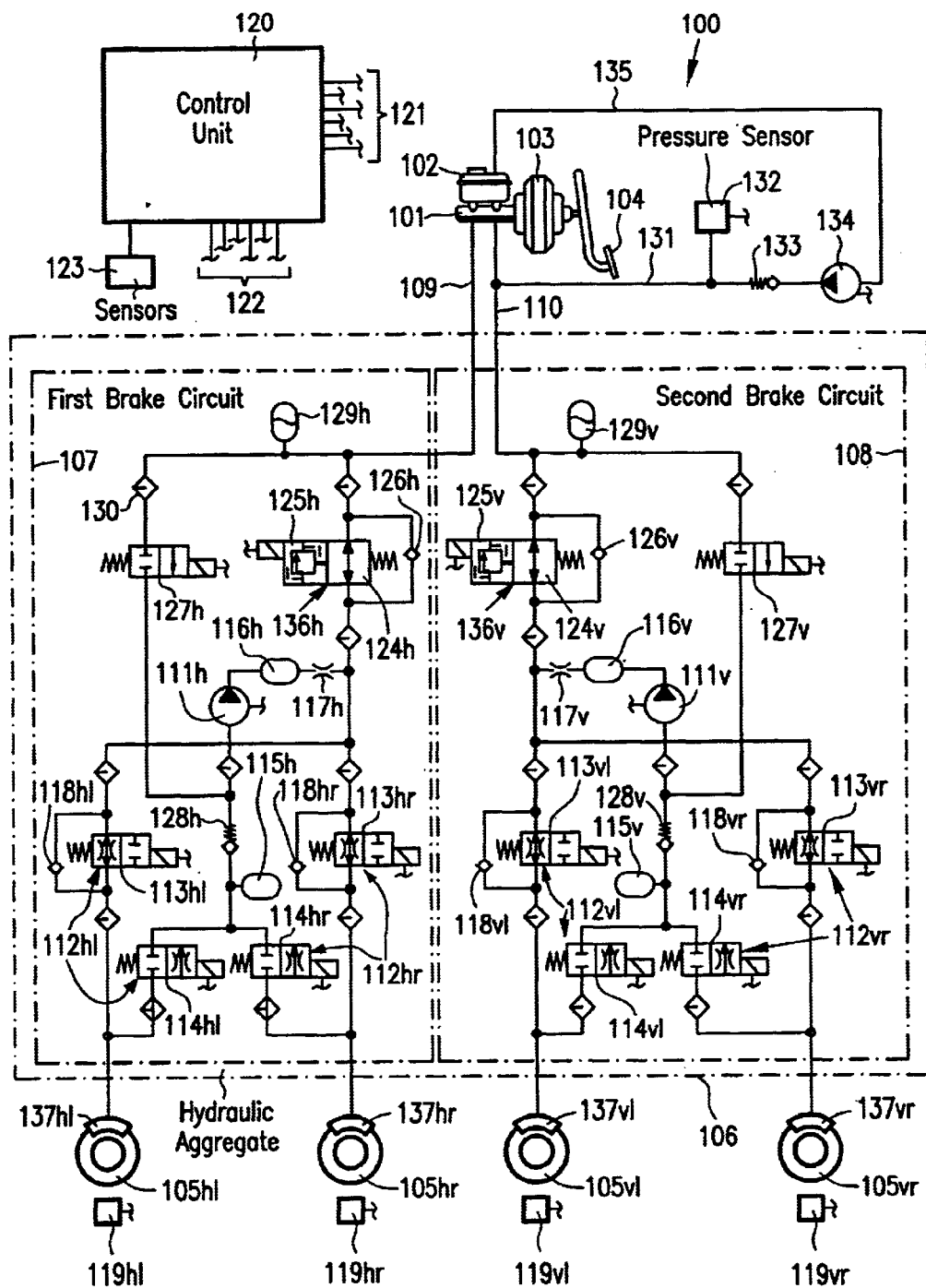
FIG. 1 shows a braking system of a device according to the present invention, which includes a control unit.

FIG. 1 shows an exemplary embodiment of a braking system according to the present invention which is provided in a vehicle. The braking system includes a dual-circuit master brake cylinder 101, a reservoir 102, a pneumatic power brake unit 103, a brake pedal 104 and two brake circuits 107, 108. The two wheels 105$hl$ and 105$hr$, respectively, together with the associated wheel brake cylinders 137$hl$ and 137$hr$, respectively, are allocated to a first brake circuit 107. The two wheels 105$vl$ and 105$vr$, respectively, together with the associated wheel brake cylinders 137$vl$ and 137$vr$, respectively, are allocated to a second brake circuit 108. A hydraulic aggregate (e.g., a modulator) 106 is arranged between master brake cylinder 101 and wheel brake cylinders 137$hl$, 137$hr$, 137$vl$ and 137$vr$, respectively.

Provided below is a simplified way of describing the wheels of the vehicle as 105$ij$. In so doing, the index i indicates whether the wheel is located at the rear axle (h) or at the front axle (v). The index j indicates the allocation to the right (r) or left (l) side of the vehicle. This designation by the two indices i and j applies for all variables or components for which it is used, e.g., the wheel brake cylinders 137$ij$ or the valves and pumps contained in the braking system.

The brake-circuit split shown in FIG. 1 is, e.g., a "black/white split." This brake-circuit split includes first brake circuit 107, and second brake circuit 108. This brake-circuit split is not intended to represent any restriction. It is also conceivable to use the method of the present invention and the device of the present invention in a braking system having a different brake-circuit split, e.g. a diagonal split.

Master brake cylinder 101 is constructed in a conventional manner, and can be actuated using brake pedal 104, so that brake pressures develop in first and second brake circuits 107, 108. The effect that is able to be exerted by brake pedal 104 on master brake cylinder 101 can be intensified by power brake unit 103. Reservoir 102 supplies master brake cylinder 101 with pressurized medium which is able to be forced from master brake cylinder 101 in the direction toward wheel brake cylinders 137$ij$ through hydraulic aggregate 106, for a normal braking operation.

Hydraulic aggregate 106 is designed as a "return type" for influencing wheel slip in response to actuation of brake pedal 104, and has a return pump 111$h$ for brake circuit 107 and a return pump 111$v$ for brake circuit 108. In addition, hydraulic aggregate 106 has a first valve arrangement 112$ij$ for each of wheel brake cylinders 137$ij$, the first valve arrangement in each case including a first valve 113$ij$, an intake valve, and a second valve 114$ij$, a discharge valve. Furthermore, brake circuits 107 and 108, respectively, each contain a storage chamber 115$i$. Also provided in corresponding manner are, for example, damping chambers 116$i$ and damping throttles 117$i$. The motor required for the drive of return pumps 111$i$ is not shown in FIG. 1. It is also conceivable to provide a separate motor for each return pump 111$i$. The structural arrangement of return pumps 111$i$ can also be implemented in a different manner.

Starting from wheel brake cylinders 137$ij$, their respective intake valves 113$ij$ are able to be by-passed in the direction toward master brake cylinder 101 with the assistance of check valves 118$ij$, which are able to be opened in the direction toward master brake cylinder 101 in response to a pressure drop via the respective intake valve 113$ij$, for example, when it is controlled into its blocking position, or when in its normal open position, an allocated throttle is operative.

When brake pedal 104 is actuated, and therefore brake pressure is supplied to wheel brake cylinders 137$ij$, wheel-slip closed-loop control is possible with the assistance of the indicated individual elements of hydraulic aggregate 106. To this end, intake valves 113$ij$ between respective wheel brake cylinders 137$ij$ and master brake cylinder 101 are normally in the open position, the flow-through position, so that by actuating brake pedal 104, pressure produced in master brake cylinder 101 normally arrives in wheel brake cylinders 137$ij$. Discharge valves 114$ij$, also connected in each case to wheel brake cylinders 137$ij$, are closed in the normal position, the blocking position, and permit a throttling passage in the controlled position, and are connected on the intake side to associated return pump 11$i$. Dampers 116$i$ are adjacent to return pumps 111$i$ on the output side. Throttles 117$i$ follow damping chambers 116$i$ in the direction toward master brake cylinder 101, as well as toward the respective intake valves 113$i$.

Also belonging to hydraulic aggregate 106 are a control unit 120 and wheel speed sensors 119$ij$ allocated to wheels 105$ij$. Signals nij, generated using wheel speed sensors 119$ij$, are fed to control unit 120. This is indicated in FIG. 1 by the electric lines going out from wheel speed sensors 119$ij$, as well as by connections 122 at the control unit, which represent the signals fed to the control unit. Further sensors connected to control unit 120 are indicated by block 123. The pumps and valves described above, as well as further pumps and valves yet to be described below, are connected to control unit 120. This is indicated by connections 121, which represent the control signals exiting control unit 120, and by the electric lines located at the valves and pumps, respectively.

For example, control unit 120 can be a control unit for the closed-loop control of the brake slip, or for the traction control, or for the control of a variable describing the operating dynamics of the vehicle, particularly the vehicle yaw rate.

For automatic braking, hydraulic aggregate 106 also has selector valves 136$i$, which in a first position, behave as gate valve 124$i$, and in a second position, behave as pressure-limiting valve 125$i$. Arranged parallel to these selector valves 136$i$ are check valves 126$i$. Check valves 126$i$ ensure that the initial pressure Pvor set by the driver is made available. In addition, precharging valves 127$i$ and check valves 128$i$ are also allocated to return pumps 111$i$ on the intake side. Valves 127$i$ and 136$i$ are subsequently combined to form a second valve arrangement, valve 127$i$ being intended to represent the first valve, and valve 136$i$ being intended to represent the second valve of the second valve arrangement. Damping chambers 129$i$ are provided in each case between the connections of selector valves 136$i$ and precharging valves 127$i$ which are facing master brake cylinder 101. At least one pump aggregate 134, particularly a precharging pump, which is allocated to second brake circuit 108 is provided for supplying hydraulic aggregate 106 for an automatic braking operation. A connection exists to first brake circuit 107 via master brake cylinder 101. Running from pump aggregate 134 to a main brake line 110, which is located between master brake cylinder 101 and hydraulic aggregate 106, is a feed line 131, into which is installed a check valve 133 that can be opened toward main brake line 110. Pump aggregate 134 is connected to reservoir 102 by a suction line 135. Provision is made between check valve 133 and main brake line 110 for a sensor 132 which generates a signal that represents the initial pressure Pvor set by the driver.

First brake circuit 107 is connected, via a main brake line 109 allocated to it which is likewise located between master brake cylinder 101 and hydraulic aggregate 106, to master brake cylinder 101.

In addition to the components described above, hydraulic aggregate 106 includes filters 130 provided at various locations, which will not be discussed in more detail below.

It is also conceivable to implement the above-described operation of the braking system using different components. Moreover, the presentation of a hydraulic braking system is not restricting in any manner. The use of the method and device according to the present invention would also be conceivable in connection with a pneumatic braking system, an electrohydraulic braking system, or an electropneumatic braking system.

Figure 2:
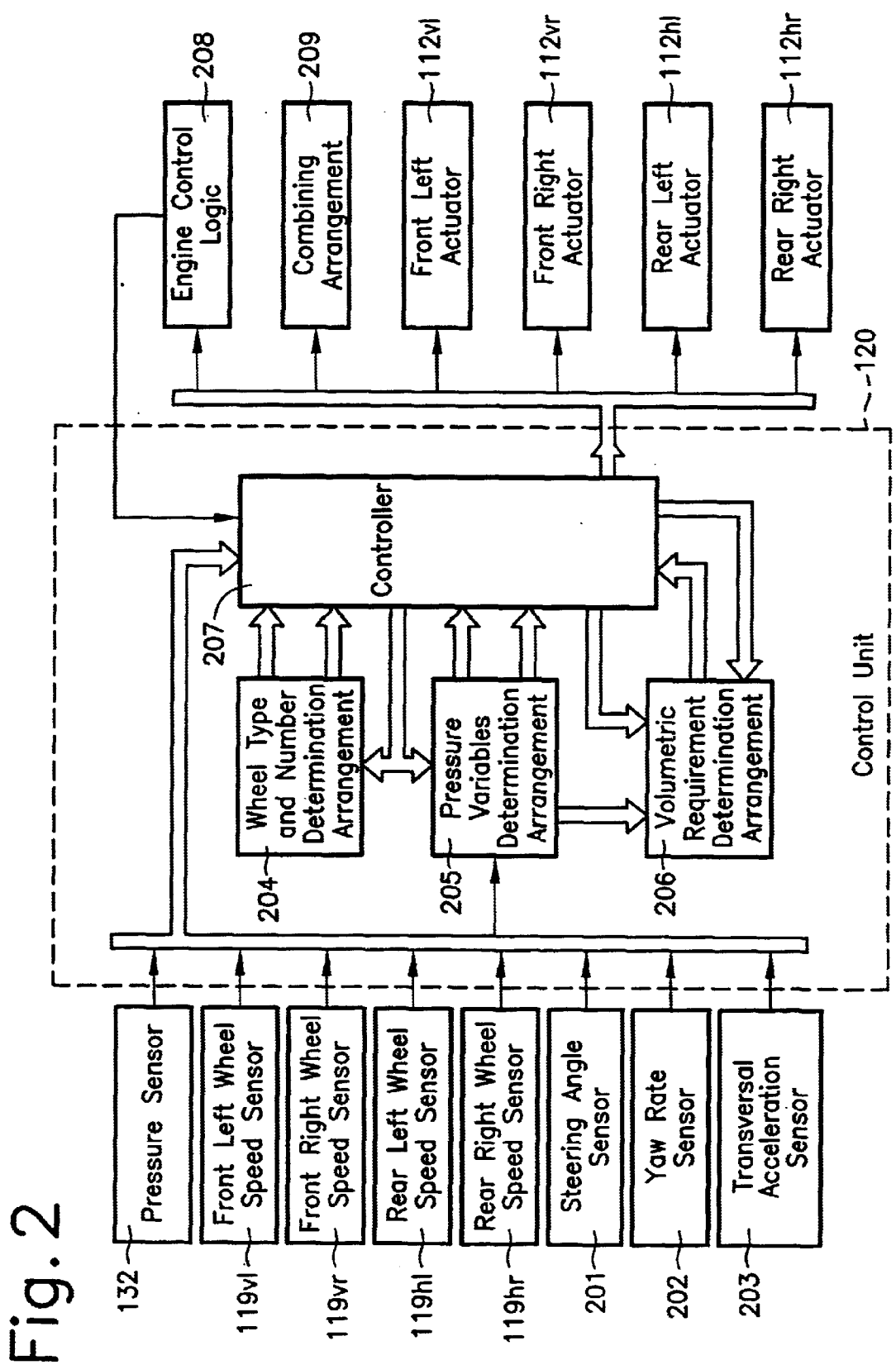
FIG. 2 shows a detailed view of the control unit of the braking system illustrated in FIG. 1 for implementing a method according to the present invention.

FIG. 2 shows a block 120 which represents the control unit contained in the device of the present invention for the closed-loop control of at least one operating-dynamics variable of a vehicle (not shown). Blocks 132, 119$ij$, 201, 202 and 203, respectively, represent means which detect the specific vehicle variables for the closed-loop control of at least one operating-dynamics variable, as it is described in the publication "FDR—Die Fahrdynamikregelung von Bosch" mentioned above. Block 132 represents a pressure sensor which detects an initial pressure variable Pvor that describes the initial pressure adjusted by the driver. Blocks 119$ij$ represent wheel-speed sensors which detect corresponding wheel-speed variables nij for the wheels. Block 201 represents a steering-angle sensor which detects the steering angle delta adjusted by the driver. Block 202 represents a yaw-rate sensor which detects the yaw rate omega of the vehicle, i.e., the rotational speed of the vehicle about its vertical axis of plane. Block 203 represents a transversal-acceleration sensor which detects the transversal acceleration aq acting on the vehicle. The variable omega represents the vehicle operating-dynamics variable which is controlled by the device of the present invention.

The above-described sensors are characteristic for so-called operating-dynamics closed-loop control systems as are described in the publication "FDR—Die Fahrdynamikregelung von Bosch" mentioned above. Blocks 201, 202 and 203, respectively, are combined in FIG. 1 to form block 123.

Variables Pvor, nij, delta, omega and ag, detected by the sensors, are fed to a block 207 which represents the controller implemented in control unit 120, and described below.

Determined in a block (e.g., an arrangement) 204 is the type and number of wheel brake cylinders of the brake circuit at which the brake pressure is increased, i.e., the active wheel brake cylinders of the brake circuit are ascertained. The type and number of these wheel brake cylinders is ascertained as a function of variables UventRadij which, starting from block 207, are fed to block 204. Variables UventRadij are the driving times of actuators 112$ij$, by which braking torque can be generated at the vehicle wheels. In particular, these variable are the valve-driving times. Actuators 112$ij$ shown in FIG. 2 correspond to valves 113$ij$ and 114$ij$ shown in FIG. 1, i.e., actuators 112$ij$ correspond to the first valve arrangements. The determination of variables UventRadij shall be discussed below.

For example, to ascertain the number of active wheel brake cylinders in a brake circuit, it is checked for each wheel brake cylinder whether the variable UventRadij is positive, since for a positive variable UventRadij, the respective first valve arrangement is driven in such a way that brake pressure is built up in corresponding wheel brake cylinder 137$ij$. To that end, variable UventRadij is compared in particular to the value zero. If the corresponding variable UventRadij is positive, then a variable (e.g., a counter) RadKn is increased. In the counter RadKn, the letter n designates the corresponding brake circuit. If the braking system has two brake circuits, then letter n assumes the values 1 and 2, respectively. This designation by the letter n is corresponding for other quantities or variables for which it is used as well.

When ascertaining the type of wheel brake cylinders active in a brake circuit, it is determined based on the variables UventRadij, e.g., whether the front wheel in a brake circuit is active, i.e., whether brake pressure is being built up at this front wheel. If brake pressure is being built up at the front wheel of the brake circuit, then the value TRUE is assigned to variable KnVR. Determining the type of active wheels is not absolutely necessary for the braking system shown in FIG. 1, since this braking system has a black/white split, in which first brake circuit 107 includes the rear wheels, and second brake circuit 108 includes the front wheels. However, the determination is important, for example, for a braking system having a diagonal split. Since the method and device of the present invention are usable for any braking systems as desired, this determination of the type of active wheels is provided from the beginning, in order to be compatible with all conceivable braking systems.

Both the counter RadKn produced in block 204 and the variable KnVR are fed to block 207.

Ascertained in a block (e.g., an arrangement) 205 are pressure variables Pij which describe the brake pressures prevailing in the wheel brake cylinders of the wheels. For example, pressure variables Pij, as described in the publication "FDR—Die Fahrdynamikregelung von Bosch" mentioned above, are ascertained as a function of initial pressure Pvor, and as a function of valve-driving times UventRadij for means (e.g., an arrangement) 112$ij$. For example, in doing this, pressure variables Pij are ascertained using a mathematical model. Starting from block 205, pressure variables Pij are fed both to a block 206 and to block 207. As an alternative to the determination of pressure variables Pij described above, it is also possible to detect these pressure variables using pressure sensors which are allocated to the corresponding wheels.

The brake-circuit wheel brake cylinder exhibiting the greatest brake pressure is determined in block 205 on the basis of pressure variables Pij. This wheel brake cylinder is stored in variable RadPmaxKn. The brake-circuit wheel brake cylinder exhibiting the greatest brake pressure is ascertained in a known manner by comparing pressure variables Pij with one another. Starting from block 205, variable RadPmaxKn is fed to block 207.

In block 206, the volumetric requirement Volumenbedarfij of each of the wheel brake cylinders is determined. For this purpose, pressure variables Pij issuing from block 205, as well as both the variables UventRadij and setpoint brake-pressure variables Psollij issuing from block 207 are fed to block 206. Setpoint brake-pressure variables Psollij describe the brake pressure to be adjusted in the associated wheel brake cylinder on the basis of the closed-loop control. Issuing from block 206, volumetric requirements volumenbedarfij, ascertained for the wheel brake cylinders, are fed to block 207.

Volumetric requirements volumenbedarfij of the individual wheel brake cylinders are determined in the following manner. Using the valve-driving time UventRadij, it is decided for the wheel brake cylinders, whether a build-up in brake pressure or a reduction in brake pressure exists for this wheel brake cylinder. If a reduction in brake pressure exists, then a small, specifiable value PminKn is used as the brake-pressure reference variable. In the present exemplary embodiment, this value PminKn is a definitively predefined value, which is stored in block 206. Alternatively, value PminKn can also be adaptively determined. A difference is formed as a function of the brake pressure prevailing in the corresponding wheel brake cylinder, and of the brake-pressure reference variable. The respective volumetric requirement volumenbedarfij is determined with the aid of a first mathematical model, particularly using physical relationships. For example, the following physical relationship is the basis of this first mathematical model:

$$\text{Volumenbedarfij} = \text{UventRadij} \cdot \sqrt{\text{Pij} - \text{Pmin Kn}} \quad (1)$$

As can be gathered from the above equation (1), the volumetric requirement volumenbedarfij is ascertained as a function of valve-driving time UventRadij, and of the above-described pressure difference. It is advantageous when the throttle diameters of the valves used in the braking system are taken into account when ascertaining the volume requirement volumenbedarfij.

If, on the other hand, a build-up of brake pressure exists, then the corresponding setpoint brake-pressure variable Psollij is used as the brake-pressure reference variable. A difference is likewise formed as a function of the brake pressure prevailing in the corresponding wheel brake cylinder, and of the brake-pressure reference variable. The corresponding volumetric requirement volumenbedarfij of the wheel brake cylinder is ascertained using a second mathematical model. In the case of this second mathematical model, a characteristics field is evaluated as a function of the brake pressure prevailing in the wheel brake cylinder. Through the evaluation, a value is obtained by which the above-described pressure difference is assessed, whereby the corresponding volumetric requirement of the wheel brake cylinder is yielded. Here, as well, it is advantageous if the throttle diameters of the valves used in the braking system are taken into account when ascertaining the volume requirement.

The controller or vehicle controller implemented in control unit 120 is designated by 207. This controller at the same time also includes a control logic for engine 208, a block 209 and actuators 112ij. Pumps 111i, 134 contained in the braking system, as well as valves 127i and 136i of the second valve arrangement, are combined in block (e.g., an arrangement) 209. Controller 207 is one which, in its basic function, controls, by braking interventions and/or by engine interventions, a variable describing the operating dynamics, e.g., a variable describing the vehicle yaw rate. At this point, reference is made to the above-described publication "FDR—Die Fahrdynamikregelung von Bosch". Alternatively, controller 207 can also be a brake-slip controller and/or a traction control.

The control taking place in its basic function in block 207 is based, in a known manner, on the variables Pvor, nij, delta, omega, aq, and a variable mot2 that describes, e.g., the rotational speed of engine 208, which are fed to block 207.

Controller 207 generates control signals and/or control variables mot1, Ai, AVLP and Aij which drive engine 208, the components combined to form block 209, as well as actuators 112ij. Reference is made to the above-described "FDR—Die Fahrdynamikregelung von Bosch" with respect to the generation of variable mot1. First, the control signals and/or control variables Ai and AVLP, respectively, are determined based on the volumetric requirements volumenbedarfij. Valves 127i and 136i, respectively, as well as pumps 111i are driven by Ai. This is discussed in detail below in connection with FIG. 3. Pump 134 is driven by AVLP. Secondly, the control signals and/or control variables Aij for actuators 1121j are ascertained. The determination of Aij is also described in detail below in connection with FIG. 3. For example, the throttle-valve position of the engine is influenced with the aid of control variable mot1.

The method according to the present invention, executed by the device according to the present invention, is shown in FIG. 3 in a flow chart form. For the sake of clarity, the description in FIG. 3 is directed to first brake circuit 107. This is not intended to represent any restriction. The method of the present invention proceeds correspondingly for second brake circuit 108. In the normal case, the method shown in FIG. 3 proceeds in parallel both for first brake circuit 107 and for second brake circuit 108, i.e., contemporaneously in the device according to the present invention.

To begin with, as described above, the method of the present invention, shown in FIG. 3, proceeds in response to a driver-independent brake actuation, particularly in response to a driver-independent build-up of brake pressure. For this reason, the representation of such query was dispensed with in FIG. 3.

The method of the present invention begins with a step 301. In this step, the variable RadPmaxK1 is ascertained. At this point, reference is made to the description of block 205 contained in FIG. 2, in which this variable is determined. Subsequently to step 301, a step 302 is carried out. In step 302, the variables RadK1 and K1VR, respectively, are ascertained. These two variables are ascertained in block 204 shown in FIG. 2, which is why reference is made at this point to the corresponding description. Subsequently to step 302, a step 303 is carried out.

In step 303, the volumetric requirement volumenbedarfK1 of first brake circuit 107 is ascertained. The sum of the individual volumetric requirements Volumenbedarfij of the wheel brake cylinders contained in brake circuit 1 is determined. With respect to determining the volumetric requirements volumenbedarfij, reference is made to the description of block 206, in which this takes place. On the basis of the variable volumenbedarfK1, it is possible to determine whether braking medium must be fed to first brake circuit 107, or whether braking medium must be removed from first brake circuit 107.

In step 304, which follows step 303, the above-described variables and conditions are evaluated.

In step 304, variable volumenbedarfK1 is compared to a small value, in particular the zero value. If it is determined in step 304 that variable volumenbedarfK1 is less than the small value, which is synonymous with a pressure reduction being necessary for first brake circuit 107, i.e., braking medium must be removed from first brake circuit 107, then subsequently to step 304, a step 305 is carried out. If, however, it is determined in step 304 that variable volumenbedarfK1 is greater than or equal to the small value, which is synonymous with a pressure build-up being necessary for first brake circuit 107, i.e., braking medium must be fed to brake circuit 1, then subsequently to step 304, a step 309 is carried out.

If it is determined in step 304 that a reduction in brake pressure is required for first brake circuit 107, then it is necessary to open valve 136*h*, i.e., to bring it into position 124*h*, and to close valve 127*h*. Since valve 136*h* is closed during a driver-independent brake actuation, the driving time Uvent136*h* for valve 136*h*, during which this valve must be opened, is determined in step 305.

Driving time Uvent136*h* is ascertained as follows. A brake-circuit pressure variable Pkreis1 which describes the brake pressure prevailing in first brake circuit 107 is ascertained. This brake-circuit pressure variable Pkreis1 can be determined, for example, according to the method as described in German Patent Application No. 197 12 889.0. A difference is formed as a function of this brake-circuit pressure variable and of the initial pressure variable Pvor which describes the initial pressure adjusted by the driver. As a function of this difference and of the volumetric requirement volumenbedarfK1, the driving time Uvent136*h* is determined using a fourth mathematical model, in particular using physical relationships. For example, the fourth mathematical model can be described by the following equation:

$$\text{Uvent136}h = \text{Volumenbedarfk1}/\sqrt{\text{Pkreis1} - \text{Pvor}} \quad (2)$$

It is advantageous if driving time Uvent136*h* is specific to the throttle diameters of the valves used in the braking system.

Following step 305, a step 306 is carried out. In this step 306, as described above, valve 113*hj* is opened and valve 114*hj* is closed for the wheel which is determined by the variable RadPmaxK1, i.e., for the wheel whose wheel brake cylinder exhibits the greatest brake pressure in brake circuit 1. Thus, valve 113*hj* is in the flow-through position and valve 114*hj* is in the blocking position. Subsequently to step 306, a step 307 is carried out.

In step 307, for the wheel which is not determined by variable RadPmaxK1, valve 113*hj* and/or valve 114*hj* is driven corresponding to the appertaining volumetric requirement volumenbedarfhj. In this connection, reference is made to the above-described publication "FDR—Die Fahrdynamikregelung von Bosch".

Subsequently to step 307, a step 308 is carried out, in which valve 136*h* is driven according to driving time Uvent136*h*. In addition, valve 127*h* is closed in step 308. Subsequently to step 308, step 301 is carried out once more.

If it is determined in step 304 that a build-up in brake pressure is required for brake circuit 1, then to that end, it is necessary to open valve 127*h*, and to close valve 136*h*, i.e., to bring it into position 125*h*. For this reason, in step 309, driving time Uvent127*h* is ascertained for valve 127*h*. Driving time Uvent127*h* is ascertained as follows: First of all, corresponding to step 305, a brake-circuit pressure variable Pkreis1 is ascertained. This brake-circuit pressure variable is used as an input variable for a third mathematical model, with whose aid driving time Uvent127*h* is determined. In this third mathematical model, a characteristics field is evaluated as a function of brake-circuit pressure variable Pkreis1. Through the evaluation, a value is obtained by which volumetric requirement volumenbedarfK1 is analyzed, whereby driving time Uvent127*h* is yielded. In determining driving time Uvent127*h*, it has proven advantageous to take into account both the number and the type of brake-circuit wheel brake cylinders at which brake pressure is being built up in the respective brake circuit. In addition, the delivery performance of pump 111*h* is considered in determining driving time Uvent127*h*, as well. It is furthermore advantageous if driving time Uvent127*h* is specific to the throttle diameters of the valves used in the braking system.

Subsequently to step 309, a step 310 is carried out which corresponds to step 306, as described above. Following step 310, a step 311 is carried out. This step corresponds to the already-described step 307. Subsequently to step 311, a step 312 is carried out, in which valve 127*h* is driven, i.e., is opened, corresponding to driving time Uvent127*h*. Likewise in step 312, valve 136*h* is driven in such a way that it closes. Subsequently to step 312, step 301 is carried out once more.

Both in step 308 and in step 312, pump 111*h* and pump 134 are driven in such a way that they deliver. In this manner, a constant volumetric flow is assured.

What is claimed is:

1. A device for controlling at least one operating-dynamics variable of a vehicle in a closed loop, comprising:

a braking system including at least one brake circuit and a reservoir for accommodating a braking medium, the at least one brake circuit including wheel brake cylinders, a first valve arrangement on an output side and a second valve arrangement on an input side, the first valve arrangement being connected to the wheel brake cylinders which are assigned to the at least one brake circuit, the second valve arrangement being connected to the reservoir; and a system determining a particular cylinder of the wheel brake cylinders which exhibits a highest brake pressure, wherein the system adjusts a particular brake pressure of the particular cylinder in response to a driver-independent brake actuation, the particular brake pressure being adjusted by driving the second valve arrangement, and wherein the system drives the first valve arrangement which is assigned to a respective cylinder of the wheel brake cylinders, the first valve arrangement being driven to adjust a further brake pressure of at least one remaining cylinder of the wheel brake cylinders, and further comprising:

a first arrangement determining volumetric requirement values for the wheel brake cylinders which are assigned to the at least one brake circuit, wherein the system performs at least one of the following functions:

driving the second valve arrangement as a function of a sum of the volumetric requirement values, and driving the first valve arrangement of the at least one remaining cylinder as a function of a particular value of the volumetric requirement values of a corresponding wheel brake cylinder of the at least one remaining cylinder.

2. The device according to claim 1, wherein the first arrangement determines the volumetric requirement values of a corresponding cylinder of the wheel brake cylinders as a function of at least one of:

driving times for actuating the first valve arrangements which are assigned to the corresponding cylinder, a corresponding brake pressure in the respective cylinder, and a brake-pressure reference variable.

3. The device according to claim 2, wherein at least one value of the volumetric requirement values is determined as a function of a difference between the corresponding brake pressure and the brake-pressure reference variable.

4. The device according to claim 2, wherein the system determines one of a build-up and a reduction of the corresponding brake pressure in the corresponding cylinder as a function of the driving times, and wherein the system performs at least one of the following:
sets the brake-pressure reference variable as a predetermined pressure value if the corresponding brake pressure is reduced, the first arrangement determining the volumetric requirement values using a first mathematical model, and sets a setpoint brake-pressure variable as the brake-pressure reference variable, the setpoint brake-pressure variable being indicative of the corresponding brake pressure to be adjusted in the corresponding cylinder due to the closed-loop control, the first arrangement determining the volumetric requirement values using a second mathematical model.

5. The device according to claim 4, wherein the first mathematical model includes a physical relationship determined by $$Volumenbedarfij = UventRadij \cdot \sqrt{Pij - PminKn},$$

wherein Volumenbedarfij is the volumetric requirement, UventRadij is the valve driving time, Pij is the pressure variables and PminKn is the brake-pressure reference variable.

6. The device according to claim 4, wherein the second mathematical model enables an evaluation of a characteristics field as a function of the corresponding brake pressure.

7. The device according to claim 4, wherein the predetermined pressure value is equal to approximately 0.4 bar.

8. The device according to claim 1, wherein the at least one brake circuit includes a pump, and the second valve arrangement includes a first valve and a second valve, wherein, when the pump is actuated and when the first valve is in a first flow-through position, the braking medium flows through the first valve into the at least one brake circuit, wherein, when the pump is actuated and when the second valve is in a second flow-through position, the braking medium flows through the second valve and exits the at least one brake circuit during actuation of the pump, wherein the system compares the sum of the volumetric requirement values to a predetermined comparison value, and wherein the system performs at least one of the following:
if the sum is greater than or equal to the predetermined comparison value, drives the first valve as a function of the sum of the volumetric requirement values, and closes the second valve, and if the sum is less than the predetermined comparison value, closes the first valve, and drives the second valve as a function of the sum of the volumetric requirement values.

9. The device according to claim 8, wherein the predetermined comparison value equals to zero.

10. The device according to claim 8, wherein the system determines a brake-circuit pressure variable which is indicative of a circuit brake pressure provided in the at least one brake circuit, and wherein the system determines driving times for driving the first and second valves, the driving times being determined as a function of the brake-circuit pressure variable and the sum of the volumetric requirement values.

11. The device according to claim 10, wherein the driving times include at least one of:

a first driving time for the first valve, the first driving time being determined using a third mathematical model, and a second driving time for the second valve, the second driving time being determined using a fourth mathematical model.

12. The device according to claim 11, wherein the third mathematical model enables an evaluation of a characteristics field as a function of the brake-circuit pressure variable.

13. The device according to claim 11, wherein the fourth mathematic model utilizes a physical relationship determined by $$Uvent136h = Volumenbedarfk1 / \sqrt{Pkreis1 - Pvor},$$

wherein Uvent136h is the driving time for valve 136h during which this valve must be opened, Volumenbedarfk1 is the volumetric requirement, Pkreis1 is the brake-circuit pressure variable and Pvor is the initial pressure set by the driver.

14. The device according to claim 8, further comprising:

a second arrangement determining, as a function of driving times for the first valve arrangement, at least one of a number and a type of further cylinders at which a corresponding brake pressure is increased, and wherein the system drives the first valve as a further function of at least one of the number and the type of the further cylinders.

15. A method for controlling at least one operating-dynamics variable of a vehicle in closed loop, the vehicle including a braking system which has a reservoir for accommodating a braking medium and at least one brake circuit, the at least one brake circuit including wheel brake cylinders, a first valve arrangement on an output side and a second valve arrangement on an input side, the first valve arrangement being connected to the wheel brake cylinders which are assigned to the at least one brake circuit, the second valve arrangement being connected to the reservoir, the method comprising the steps of:

determining a particular cylinder of the wheel brake cylinders which exhibits a highest brake pressure;

adjusting a particular brake pressure of the particular cylinder in response to a driver-independent brake actuation the particular brake pressure being adjusted by driving the second valve arrangement; and driving the first valve arrangement which is assigned to a respective cylinder of the wheel brake cylinders the first valve arrangement being driven to adjust a further brake pressure of at least one remaining cylinder of the wheel brake cylinders, and further comprising the steps of:
  determining volumetric requirement values for the wheel brake cylinders which are assigned to the at least one brake circuit; and
  performing at least one of the following substeps:
    driving the second valve arrangement as a function of a sum of the volumetric requirement values, and
    driving the first valve arrangement of the at least one remaining cylinder as a function of a volumetric requirement value of a corresponding wheel brake cylinder of the at least one remaining cylinder.

* * * * *